(12) United States Patent
Bishop et al.

(10) Patent No.: US 10,868,787 B2
(45) Date of Patent: Dec. 15, 2020

(54) METHOD FOR RECIPIENT ADDRESS SELECTION

(71) Applicant: TESSIAN LIMITED, London (GB)

(72) Inventors: Edward Bishop, London (GB); Timothy Sadler, London (GB); Thomas Adams, London (GB); Johan Kestenare, London (GB)

(73) Assignee: TESSIAN LIMITED, London (GB)

( * ) Notice: Subject to any disclaimer, the term of this patent is extended or adjusted under 35 U.S.C. 154(b) by 0 days.

(21) Appl. No.: 16/381,411

(22) Filed: Apr. 11, 2019

(65) Prior Publication Data

US 2019/0319908 A1    Oct. 17, 2019

(30) Foreign Application Priority Data

Apr. 11, 2018   (GB) .................................. 1806011.1

(51) Int. Cl.
*H04L 12/58*         (2006.01)
(52) U.S. Cl.
CPC ................... *H04L 51/28* (2013.01)
(58) Field of Classification Search
None
See application file for complete search history.

(56) References Cited

U.S. PATENT DOCUMENTS

| | | | |
|---|---|---|---|
| 6,715,003 B1 | 3/2004 | Safai | |
| 8,301,707 B1 | 10/2012 | Hebb et al. | |
| 2003/0163536 A1* | 8/2003 | Pettine, Jr. | H04W 4/12 709/206 |
| 2004/0215726 A1 | 10/2004 | Arning et al. | |
| 2006/0035632 A1 | 2/2006 | Sorvari et al. | |
| 2006/0165289 A1 | 7/2006 | Boss et al. | |
| 2007/0130368 A1 | 6/2007 | Martin et al. | |
| 2007/0280179 A1 | 12/2007 | Van Belle et al. | |
| 2007/0288578 A1 | 12/2007 | Pantalone | |
| 2009/0077026 A1 | 3/2009 | Yanagihara | |
| 2009/0172109 A1* | 7/2009 | Weir | H04L 51/00 709/206 |
| 2011/0010423 A1 | 1/2011 | Thatcher et al. | |
| 2013/0080543 A1 | 3/2013 | Jang | |
| 2013/0166657 A1 | 6/2013 | Tadayon | |
| 2016/0357761 A1 | 12/2016 | Siracusa et al. | |
| 2017/0068904 A1 | 3/2017 | Korycki et al. | |
| 2017/0142059 A1 | 5/2017 | Shuster | |

OTHER PUBLICATIONS

United Kingdom Application No. 1806011.1, Search Report dated Oct. 30, 2018, 3 pages.

* cited by examiner

*Primary Examiner* — Brian Whipple
(74) *Attorney, Agent, or Firm* — Kilpatrick Townsend & Stockston LLP (57) ABSTRACT

This disclosure relates to a method of recipient address selection, for example, for electronic mail (email). The method involves entering characters into a recipient address field to generate a recipient address list comprising recipient address options. A selection is received from a user for a recipient address in the recipient address list. After the user has selected a recipient address from the recipient address list, one or more rules are checked to determine whether they have been satisfied. The selected recipient address is entered into the recipient address field depending on if the one or more rules have been satisfied.

20 Claims, 6 Drawing Sheets

METHOD FOR RECIPIENT ADDRESS SELECTION

CROSS-REFERENCE TO RELATED APPLICATIONS

This claims benefit of and priority to U.K. Patent Application No. GB1806011.1, filed Apr. 11, 2018, and titled "Method for Recipient Address Selection," the entire contents of which are hereby incorporated by this reference for all purposes.

TECHNICAL FIELD

The present disclosure relates to a method of selecting a recipient address from a recipient address list.

BACKGROUND

Electronic mail (email) is one of the most common forms of human-to-human electronic communication presently in use. When writing an email, a user of an email client can address the email by choosing one or more recipient email addresses for the email by entering a full recipient email address into a recipient address field. In order to quicken the process of addressing emails, many email clients offer an autocomplete feature. Conventional autocomplete features in email clients operate by searching a user's address book for potential recipients based on an initial search query typed into the recipient address field, and displaying the potential recipient addresses in an autocomplete list. The user can then select a recipient address from the autocomplete list.

The use of conventional autocomplete features, such as the one described above, often leads to errors when addressing emails. In particular, a user may often select the wrong recipient address from the autocomplete list and unintentionally send the email to that recipient. Addressing errors of this kind can be particularly detrimental if emails comprising confidential information are sent to unauthorised recipients.

There is a need for methods of recipient address selection for emails that reduces addressing errors.

SUMMARY OF THE DISCLOSURE

In a first aspect, there is disclosed a method of selecting a recipient address from a recipient address list. The method according to the first aspect includes the steps of receiving characters as a user input to a recipient address field, displaying a recipient address list based on the characters received in the recipient address field, and receiving a selection from a user for a recipient address in the recipient address list. The method according to the first aspect further comprises, in connection with the recipient address list or the user input, determining if one or more rules are satisfied, and entering the selected recipient address into the recipient address depending on whether or not the one or more rules are satisfied.

In a second aspect, there is disclosed a method of selecting a recipient address from a recipient address list including the steps of receiving characters as a user input to a recipient address field, displaying a recipient address list based on the characters received in the recipient address field, and receiving a selection from a user for a recipient address in the recipient address list. The method according to the second aspect further comprises, after the selected recipient address has been entered into the recipient address field in response to the selection request and in connection with the recipient address list or the user input, determining if one or more rules are satisfied, and deleting or maintaining the selected recipient address in the recipient address field depending on whether or not the one or more rules are satisfied.

In a third aspect, there is disclosed a method of entering a recipient address in a recipient address field including the steps of receiving one or more characters into the recipient address field, displaying one or more recipient addresses based on the one or more characters, and receiving an input from the user selecting one of the recipient addresses to be entered into the recipient address field. The method according to the third aspect further comprises determining using one or more rules whether to allow the selected recipient address to be entered into the recipient address field, and if the selected recipient address is allowed, entering or maintaining the selected recipient address in the recipient address field.

In a fourth aspect, there is disclosed a device configured to perform the method of any of the first, second and third aspects.

In a fifth aspect, there is disclosed a computer program, or suite of computer programs, configured to, when run on a processor, cause a computing device to carry out the steps of the method of any of the first, second and third aspects.

In a sixth aspect, there is disclosed a computer-readable storage medium comprising the computer program of the fifth aspect.

In seventh, eighth and ninth aspects, there are provided devices comprising means for carrying out the steps in the first, second and third aspects, respectively.

Other features of the disclosure are described below and recited in the appended claims.

BRIEF DESCRIPTION OF THE DRAWINGS

The present disclosure will now be described, by way of example only, and with reference to the accompanying drawings, in which.

DETAILED DESCRIPTION

The present disclosure relates to a method of recipient address selection, for example, for email. The method involves entering characters into a recipient address field to subsequently generate a recipient address list comprising recipient address options. A recipient address for the email is requested by the user selecting the recipient address from the recipient address list. After the user has selected a recipient address from the recipient address list, one or more rules are checked to determine whether they have been satisfied. If the rules are all determined as being satisfied, the selected recipient address is entered into the recipient field. However, if at least one of the rules are not determined as being satisfied, the selected recipient address is not entered into the recipient field. Rules are employed in a structured graphical user interface as checks and safeguards to minimise the risk of a user selecting a recipient address from the recipient address list in error. This implementation of the rules as checks and safeguards improves a computer's ability to function as a tool. For example, the rules might include ensuring that the user has typed in more than a minimum number of characters into the recipient address field, or that the recipient address list comprises less than a threshold number of recipient address options, before selecting a recipient address. Other rules might include consulting a list of permissible selection methods to ensure that the user has selected the recipient address with a permitted input device (e.g. a computing mouse), or consulting a list of unauthorised recipient addresses to ensure the user has not selected a blacklisted recipient address. Accordingly, the rules improve the utility and ease of use of recipient address selection. The rules that are employed and their strictness may be dynamically adjustable based on factors such as the time of day and the location of the user. Equally, the rules and their strictness may be manually configurable by a user.

Figure 1:
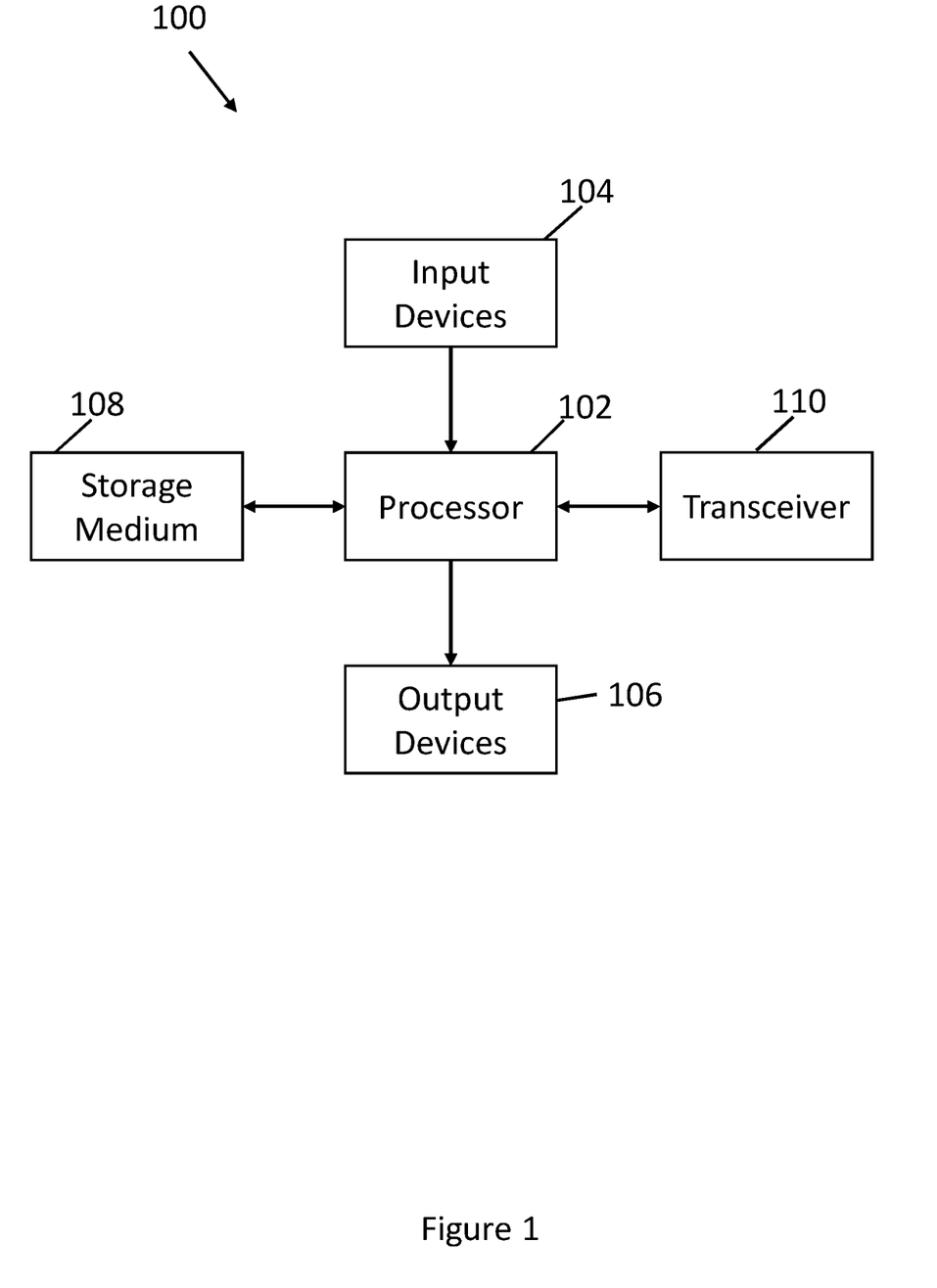
FIG. 1 shows the components of a computing device according to an embodiment of the present disclosure.

FIG. 1 shows the components of a computing device 100 configured to perform a method of recipient address selection for an email according to an embodiment of the present disclosure. The computing device 100 comprises a processor 102 in data communication with input devices 104, output devices 106, a storage medium 108, and a transceiver 110.

The input devices 104 are configured to transmit user input data to the processor 102 in response to user input. One of the user input devices 104 may be a computing keyboard, in which case the computing keyboard is configured to transmit all keyboard input data, including characters, symbols, and commands, to the processor 102. One of the user input devices 104 may be a computing mouse, in which case the computing mouse is configured to transmit all pointer location and button event data, such as click events and scroll events, to the processor 102.

The storage unit 108 is configured to store data received from the processor 102. The storage unit 108 is also configured to transmit data to the processor 102 upon request by the processor 102. The storage unit 108 may be any type or size of data storage medium known by the person skilled in the art. For example, the storage unit may be a hard disk drive, a solid state drive or flash memory.

The processor 102 is configured to perform processing on user input data received from the input devices 104 and data retrieved from the storage unit 108. The processor 102 is also configured to transmit output data to the output devices 106, and both transmit and receive data from the transceiver 110. The output data includes graphical output data and/or audio output data. The processor 102 may be any type of processor known by the person skilled in the art that is capable of performing computing tasks in relation to email and email clients.

The output devices 106 are configured to receive output data from the processor 102. The output devices 106 include a display device, in which case the display device is configured to graphically display information in accordance with graphical output data received from the processor 102. The output devices 106 also include a loudspeaker device, in which case the loudspeaker device is configured to output audio in accordance with audio output data received from the processor 102.

The transceiver 110 is configured to provide the device 100 with an Internet connection. For example, the transceiver 110 may comprise Wi-Fi and/or cellular phone capabilities to provide the device 100 with the Internet connection. In this respect, the device 100 may be in data communication with external servers and cloud services by virtue of the transceiver 110 and the Internet connection that it provides.

The skilled person will appreciate that the computing device 100 described above may be embodied as different types of computing devices including desktop computers, laptop computers, tablets, mobile devices and servers. Furthermore, the skilled person will appreciate that such computing devices may include variants of the components described above, such as multiple processors or storage units working in parallel or series, and different types of input and output devices such as touchscreens and virtual keyboards. Particularly, it should be appreciated that the functionality of input devices such as a computing mouse or a computing keyboard as described in this application can be substituted using touch screen functions and virtual keyboards on tablets or mobile devices. The skilled person will also appreciate that the methods described herein may be performed on the computing device 100 as a computing program, or a suite of computer programs, configured to cause the computing device 100 to carry out steps in all such methods when run on the processor. Such computer program (s) may be stored in a computer-readable storage medium such as the storage medium 108. Hence, the computing device 100 may be configured to and/or provide means for executing the steps of the methods described herein.

Figure 2A:
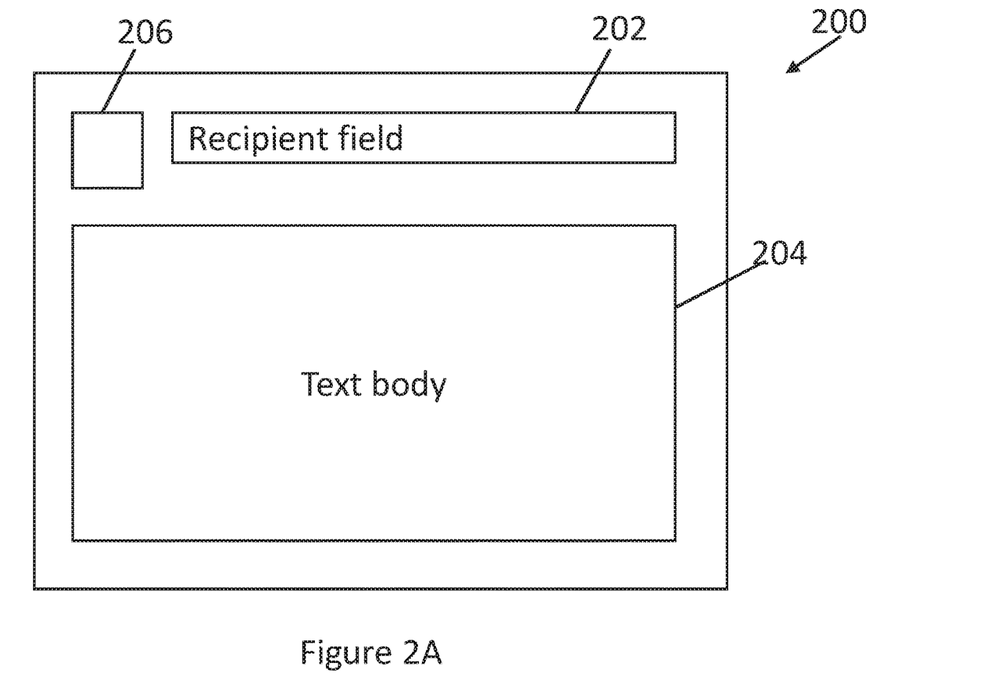
FIGS. 2A and 2B show a user interface of an email client according to an embodiment of the present disclosure.
Figure 2B:
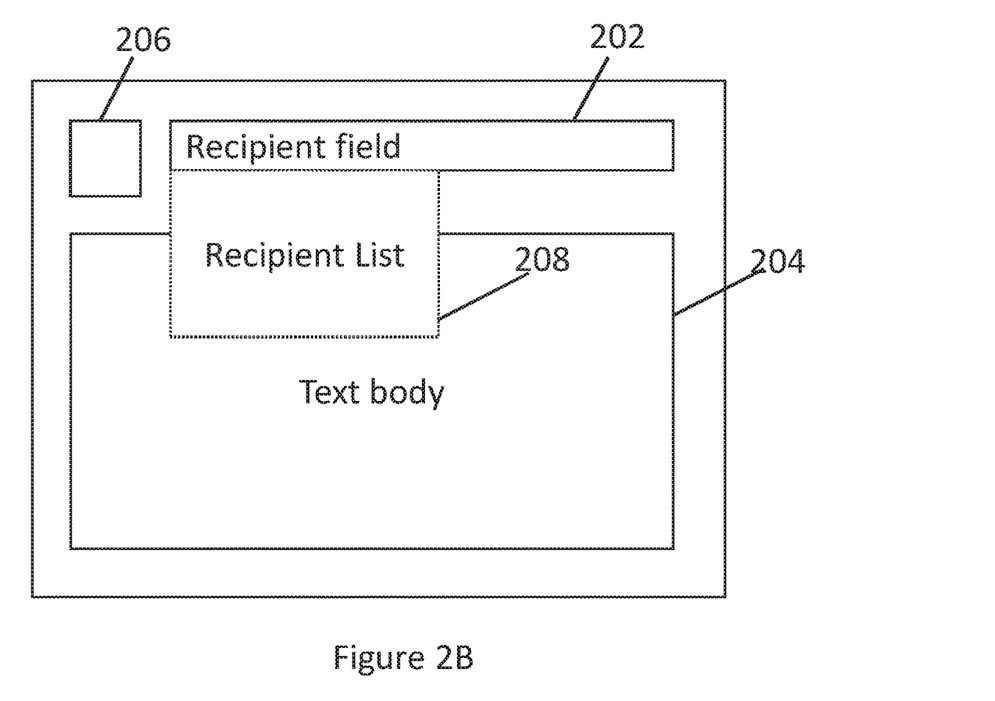

FIGS. 2A and 2B show a user interface 200 of an email client for selecting recipients for an email according to an embodiment of the present disclosure. The user interface 200 comprises a recipient address field 202, a text body 204, and a send button 206. Furthermore, during certain use of the user interface 200 and email client, the user interface 200 also displays a recipient address list 208.

The recipient address field 202 of the user interface 200 is configured to receive user input data in the form of characters or symbols so that a user can type and choose recipient addresses for the email. For example, a user may type characters or symbols into the recipient address field 202 using a computing keyboard.

The recipient address list 208 is configured to display suggested recipient address options for the email. The recipient address list 208 is absent from the user interface 200 until a user inputs data into the recipient address field 202, after which the recipient address list 208 is generated based on the data in the recipient address field 202. This is in order to avoid unnecessary obstruction of the user interface 200. The generation and use of the recipient address list 208 will be described in greater detail below according to the method 300 in FIG. 3.

The text body 204 is configured to receive character or symbol input for a user to write the contents of the email. The send button 206 is configured to send the contents of the text body 204 to recipient(s) listed in the recipient address field 202. The send button 206 can be selected using an input device such as a computing mouse. Additionally or alternatively, the send button 206 may be selected using a designated key on a computing keyboard.

It should be appreciated that the email client described above can comprise other features and functionalities that are known to be common for email clients and email user interfaces by the skilled person, such as: subject fields, file attachment options, formatting options, CC and BCC fields, email headers and timestamps. However, for simplicity of description of the present disclosure, these features have not been described in detail.

The user interface 200 of the email client described above can be displayed, processed and interacted with on the computing device 100. In this respect, the user interface 200 can be displayed, processed and interacted with using desktop computers, laptops, tablets, mobile devices or servers comprising processors, storage media, input/output devices and transceivers as previously described.

Figure 3:
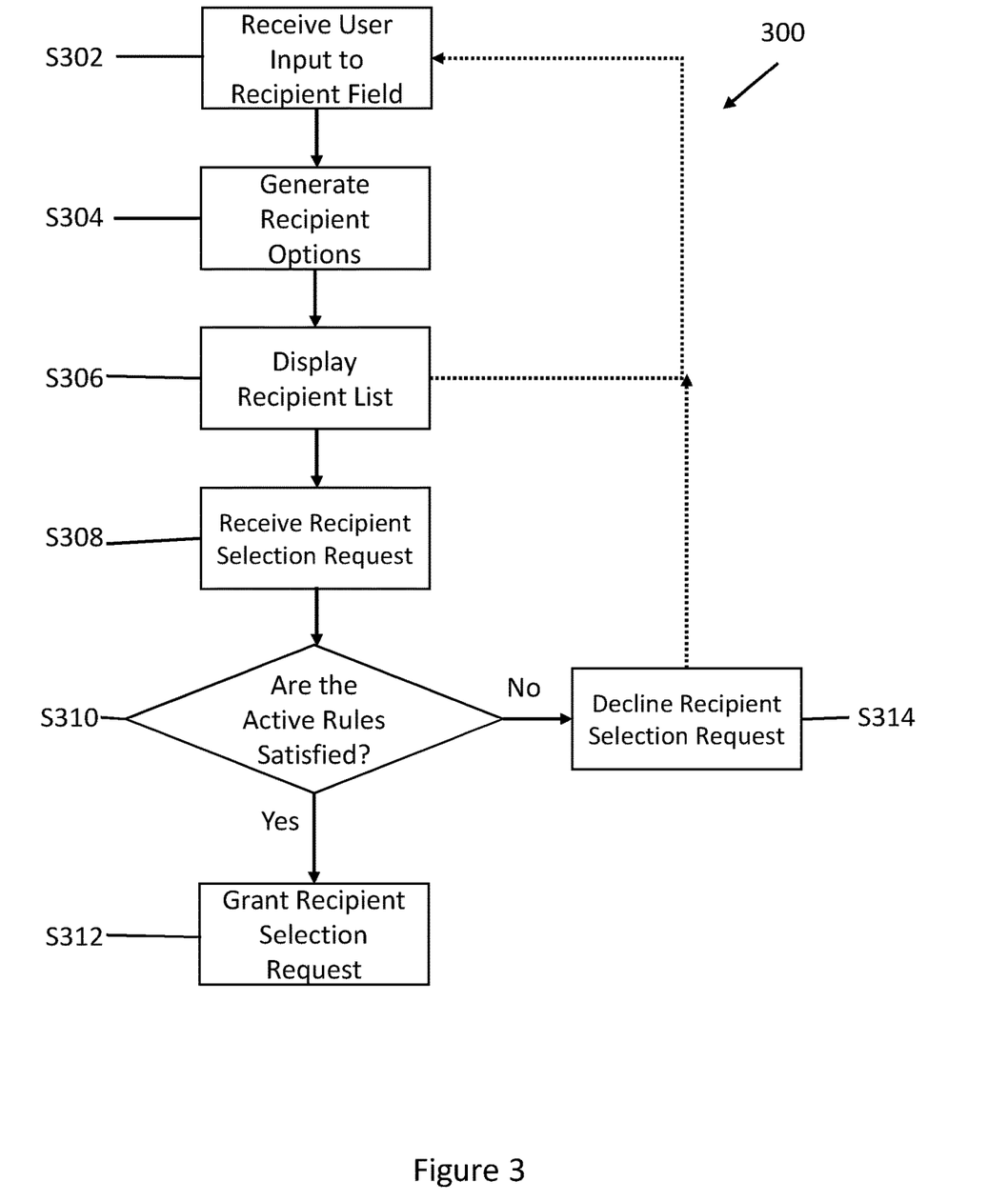
FIG. 3 is a flowchart showing a method of recipient address selection according to an embodiment of the present disclosure.

FIG. 3 shows a method 300 for selecting a recipient address for an email according to an embodiment of the present disclosure. The method 300 of FIG. 3 is described with reference to example views of the user interface 200 of the email client shown in FIGS. 4A to 4E.

Figure 4A:
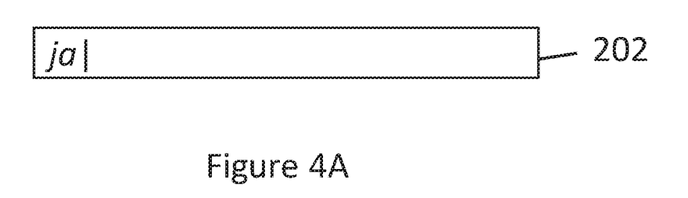
FIGS. 4A to 4E illustrate example views of the user interface whilst performing the method of FIG. 3.

At step S302, user input data indicative of a desired recipient address is received to the recipient address field 202. The user input data may be received in the form of characters or symbols typed by a user with a computing keyboard. For example, as shown in FIG. 4A, a user may type the initial characters "ja" corresponding to a recipient address to be chosen for the email.

At step S304, recipient address options are generated based on the characters in the recipient address field 202. The recipient address options may be generated using an autocomplete algorithm based on the characters in the recipient address field and an electronically stored address book of available recipient addresses. For example, in some embodiments, the autocomplete algorithm may generate recipient address options that include all recipient addresses from the address book starting with the characters "ja" in the local-part of the recipient addresses. Alternatively or additionally, the autocomplete algorithm may generate recipient address options that include all recipient addresses from the address book that comprise the characters "ja" anywhere in the local-part of the recipient addresses.

Figure 4B:
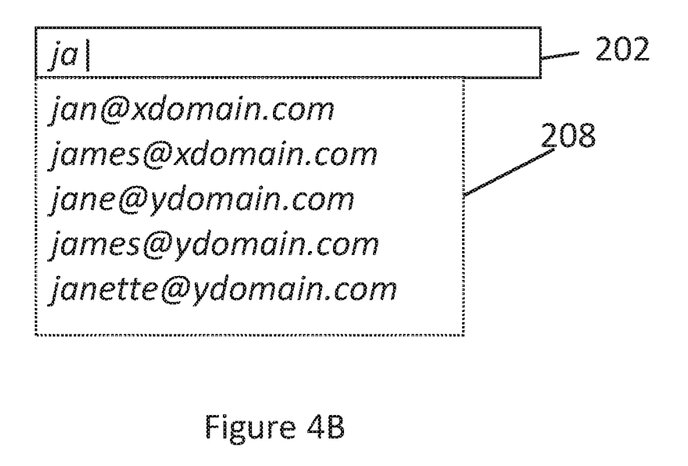

At step S306, the recipient address options are displayed in the recipient address list 208, as shown in FIG. 4B. In some embodiments, the recipient address list 208 only displays a subset of the recipient address options if the number of recipient address options exceeds a display threshold for the recipient address list 208, in which case the subset may comprise the recipient address options determined to be most relevant by the autocomplete algorithm. The recipient address list 208 may be absent from the user interface 200 until the user has inputted characters into the recipient address field 202 according to step S302 and recipient address options have been generated according to step S304. The recipient address list 208 can be traversed or scrolled through using designated keys of a computing keyboard, such as the arrow keys. Additionally or alternatively, the recipient address list 208 may be traversed or scrolled through using a computing mouse.

At this stage, the recipient address list 208 can be updated or regenerated based on subsequent user input to the recipient address field 202. For example, if the user types or deletes characters or symbols in the recipient address field 202 according to step S302, the recipient address list 208 updates or regenerates based on the new characters or symbols in the recipient address field 202 according to steps S304 and S306.

Figure 4C:
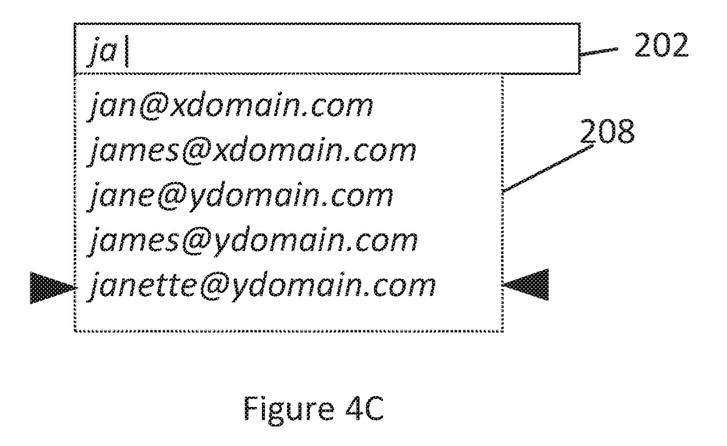

At step S308, a selection request to select a recipient address from the recipient address list 208 for the email is received. The selection request is made by the user selecting a recipient address from the recipient address list 208 with an input device, such as a computing mouse or a computing keyboard. For example, the selection request can be made using the pointer of a computing mouse to highlight the recipient in the recipient address list 208 and the button functions to confirm the selection. Additionally or alternatively, the selection request can be made with a computing keyboard using designated navigational keys to highlight the recipient and a designated confirmation key to confirm the selection. An example of this step is shown in FIG. 4C, where a selection request for the recipient address "janette@ydomain.com" is received.

At step S310, one or more active rules are checked to determine whether they have been satisfied. Rules are checked at this step to determine whether the recipient selected at step S308 has been selected in error. Each active rule is checked against a corresponding rule threshold or rule list to determine whether the active rule has been satisfied. The active rules are at least a subset of a set of available rules that have corresponding rule thresholds or rule lists. Some of the available rules may be in connection with the recipient address options present in the recipient address list 208, and/or the data present in the recipient address field 202. For example, for some rules, checking whether the rule has been satisfied may involve comparing data related to the recipient address list 208 or the recipient address field 202 to a rule threshold. In other rules, checking whether the rule has been satisfied may involve comparing the actions taken by a user performing the method 300 up to step S310 to a rule list of permissible or impermissible actions. The rules and rule thresholds/lists described herein may be stored on and retrieved from a local database stored in the storage medium 108 on the computing device 100 when required at step S310 or otherwise. Alternatively or additionally, the rules and rule thresholds/lists may be stored in a database externally on a server accessible via an Internet connection, where the rules may be invoked from the server when required at step S310 or any other step. The available rules and rule thresholds/lists will be described in greater detail below.

Figure 4D:
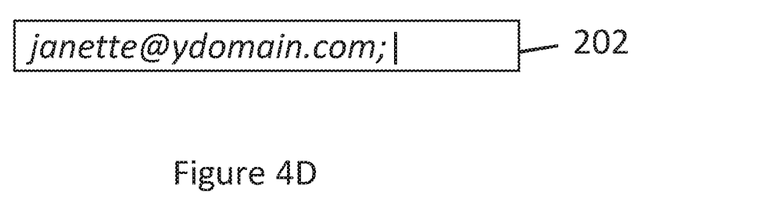
Figure 4E:
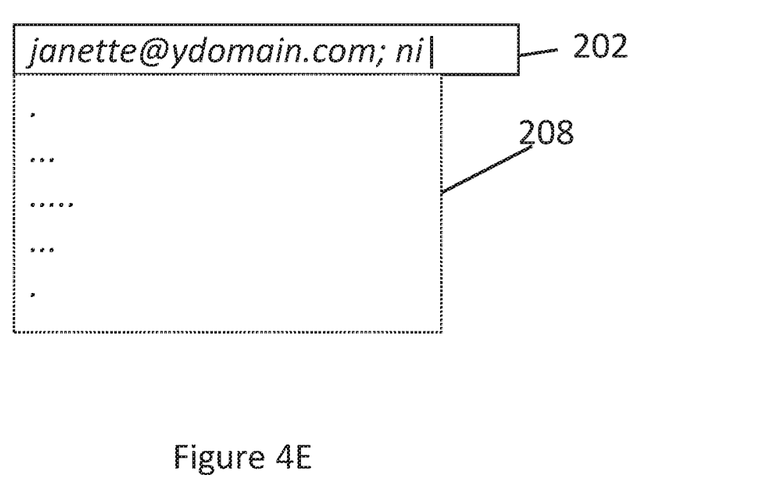

If the active rules are all determined as being satisfied at step S310, the selection request for a recipient address in the recipient address list 202 made by the user at step S308 is granted at step S312. By granting the recipient selection request, the selected recipient address is resolved in the recipient address field 202 and the recipient address list 208 is hidden from the user interface 200, as shown in FIG. 4D. In other words, the full recipient address selected at step S308 is entered into the recipient address field 202. Particularly, the partial data "ja" of the desired recipient address that was in the recipient address field 202 is completed or replaced with the full selected recipient address "janette@ydomain.com". After step S312, the method 300 can be repeated to add further recipients for the email, for example, as shown in FIG. 4E. Existing recipient addresses in the recipient address field 202 may not be considered by the autocomplete algorithm in subsequent recipient selection using the method 300 to avoid repetition of recipient address selection.

If one or more of the active rules are determined as not being satisfied at step S310, the selection request made by the user at step S308 is declined at step S314. By declining the recipient selection request, the recipient address selected at step S308 is not resolved or entered into the recipient address field 202 as shown in FIG. 4D, and instead, the state of the recipient address field 202 and recipient address list 208 remains unchanged according to FIG. 4B or 4C. Additionally, the recipient address list 208 may be removed from the user interface 200, or the characters entered into the recipient address field 202 at step S302 may be deleted. If the selection request is declined at step S314, an alert is generated and fed back to the user. For example, in some embodiments, the alert may be a sound fed back to the user via a loudspeaker output device. Alternatively or additionally, the alert may be visual such as a visible "shake" of elements of the user interface 200, such as the recipient address list 208 or the recipient address field 202. Another type of visual alert may be in the form of a visual cue, widget or an on-screen window of text that indicates the reason(s) why the recipient selection request was declined (i.e. the rules that were not satisfied). Furthermore, in some embodiments where the method 300 is being performed on a mobile device or tablet, the alert may be in the form of vibrational or haptic feedback.

As shown in FIG. 3, if the selection request is declined at step S314, the user can return to step S302 to edit the data in the recipient address field 202 (e.g. edit, remove or add more characters or symbols) and subsequently update the recipient address list at step S306 in order to satisfy the rules that have been determined as not being satisfied in step S310. Alternatively, the user may return to step S308 and select a different recipient address from the recipient address list 208 that may satisfy the active rules. The ways in which the rules can be satisfied will be described in greater detail below.

In an alternative embodiment of the method 300, if the selection request is declined at step S314, a warning window is generated on the user interface 200 to notify the user that they are attempting to select a recipient address for which the active rules have not been determined as satisfied at step S310. The warning window comprises an option for the user to override the declination at step S314. Overriding the declination results in the recipient address selected at step S308 being entered into the recipient address field 202 as previously described with respect to step S312. In the present alternative embodiment, if the declination is overridden, the recipient address is displayed in the recipient address field 202 in a visual format that is different to other recipients in the recipient address field 202 that have not been added as a result of overriding a declination following step S314. For example, a recipient address that is added to the recipient address field 202 as a result of an override may be displayed in the recipient address field 202 in a way that may visually stand out to the user, such as in a different colour (e.g. red, blue) or alternative font (e.g. bold, italic) to other recipient addresses in the recipient address field 202. In other words, recipient addresses added to the recipient address field 202 following step S314 will visually differ from recipient addresses added to the recipient address field 202 following step S312 to indicate as such. In this alternative embodiment, the warning window also comprises an option to close the warning window without overriding the declination. If the warning window is closed without overriding the declination, the recipient address selected at step 308 is not added to the recipient address field 202. Instead, the user can return to steps 302 or 308 as previously described. Whether or not a warning window is generated as a result of a declination at step S314 is determined dynamically based on one or more factors which will be described in more detail below. Alternatively, whether or not a warning window is generated as a result of the declination at step S314 can be decided manually by the user. For example, the user may select an option in the email client settings to enable the warning window and override prompt for if step S314 is reached.

According to certain embodiments of the method 300, certain data in relation to the method 300 is logged each time the method is performed. For example, for each iteration of the method 300, information such as: the user input at step S302; active rules and rule thresholds considered at step S310; the outcome of step S310; the outcome of and subsequent actions taken by the user after step S314 may be logged. As will be described below, the logged data will be useful for determining some of the rules and rule factors that are based on past uses of the method 300. Furthermore, logging the use of the method 300 may be useful for assessing the effectiveness of the method 300 for preventing email recipient address errors. The logged data may be stored and accessed locally, for example in a storage medium 108. Alternatively or additionally, the logged data may be transmitted to an external server accessible via an Internet connection, from where the logged data can be retrieved from when required.

As described above with respect to the user interface 200, the method 300 may be performed with the computing device 100. In this respect, the method 300 may be performed using any desktop computers, laptops, tablets, mobile devices or servers comprising processors, storage media, transceivers and input/output devices as described above.

The purpose of the available rules applicable at step S310 of the method 300 are to minimise the risk of the user erroneously selecting the wrong recipient at step S308. The available rules will now be described, some with respect to exemplary views of the user interface 200 shown in FIGS. 5A to 5C.

One rule is based on the number of characters or symbols that are present in the recipient address field 202. This rule will only be determined as satisfied in step S310 if the number of characters present in the recipient address field 202 is greater than a threshold number of characters. Hence, for this rule, the threshold number of characters is the rule threshold. If this rule is not satisfied at step S310 of the method 300, a user may enter more characters into the recipient address field 202 according to step S302 in order to overcome and satisfy this rule. Forcing a user to enter a minimum number of characters into the recipient address field 202, as done so by this rule, can help to minimise the risk of erroneously selecting the wrong recipient address at step S308, since more characters in the recipient address field 208 will generate a list of recipient address options in steps S304 and S306 that are closer to the desired recipient. Hence, there is less chance of the user selecting a wrong recipient.

Figure 5A:
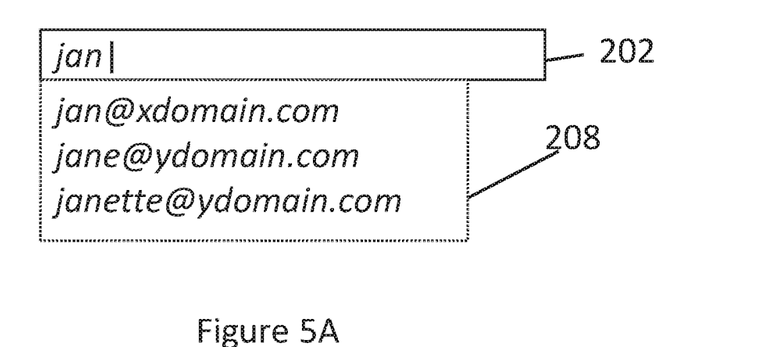
FIGS. 5A to 5C illustrate example views of the user interface during use according to further embodiments of the present disclosure.

Another rule is based on the number of recipient address options that are present in the recipient address list 208. This rule will be determined as satisfied in step S310 if the number of recipient address options present in the recipient address list 208 is less than a threshold number of recipient address options. Hence, for this rule, the threshold number of recipient address options is the rule threshold. If this rule is not satisfied at step S310 of the method 300, a user may enter or change the characters in the recipient address field 202 according to step S302 so that the recipient address list 208 is consequently regenerated in steps S304 and S306 to have fewer recipient address options than the threshold number of recipient address options and therefore satisfy this rule. For example, in FIG. 4B where the recipient address field 202 had the characters "ja", the recipient address list 208 was generated with five recipient address options. If the rule threshold for the present rule is, for example, "less than four", the present rule will not be satisfied in step S310. As shown in FIG. 5A, the user may type in extra characters so that the recipient address field 202 reads "fan", consequently reducing the number of recipient address options in the recipient address list 208 to three and hence satisfying the present rule. The rationale behind this rule is similar to that of the previous rule, in that there is less chance of mistakenly selecting a recipient address from the recipient address list 208 if the recipient address options in the recipient address list 208 are significantly reduced.

Figure 5B:
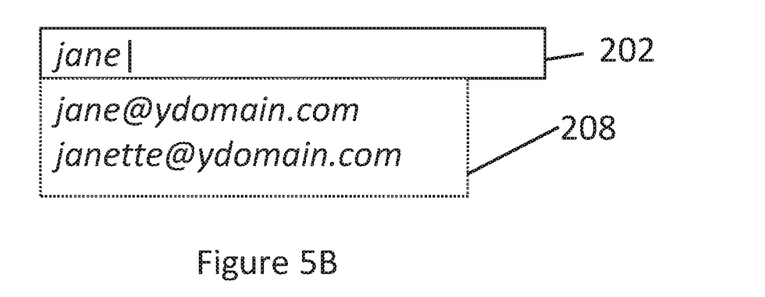

Another rule is based on the number of different domain-parts of the email addresses of the recipient address options in the recipient address list 208. This rule will be determined as satisfied in step S310 if the number of different domain-parts present in the recipient address options of the recipient address list 208 is less than a threshold number of domain-parts. Hence, for this rule, the threshold number of domain-parts is the rule threshold. If this rule is not satisfied at step S310 of the method 300, a user may enter or change the characters in the recipient address field 202 according to step S302 so that the recipient address list 208 is consequently generated in steps S304 and S306 such that the recipient address options in the recipient address list 208 comprise a number of domain-parts fewer than the rule threshold. For example, as shown in FIG. 4B, the email addresses of the recipient address options in the recipient address list 208 have a domain-part of either "@xdomain.com" or "@ydomain.com". However, if the present rule threshold is, for example, "less than two", the present rule will not be determined as satisfied in step S310 since there are two domain-parts present in the recipient address options. Hence, as shown in FIG. 5B, a user may enter the characters "jane" into the recipient address field 202 to reduce the recipient address options in the recipient address list 202 such that only one domain-part "@ydomain.com" is present in the recipient address options in the recipient address list 202. Following on from this, the present rule will be determined as satisfied when returning to step S310. This rule addresses a case where a user might mistakenly select a recipient address from the recipient address list 208 that has a similar local-part to the desired recipient address but overlook that it has a different domain-part. Hence, by reducing the recipient address options to only contain one domain-part, this type of recipient address selection error can be avoided.

Figure 5C:
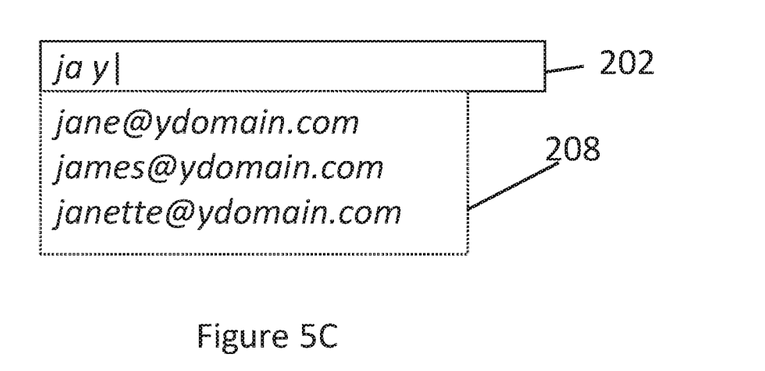

With respect to the previous rule above, it is noted that where characters are typed into the recipient address field 202 and the recipient address list 208 is generated according to steps S302 to S306, the autocomplete algorithm generates the recipient address options in the recipient address list 208 based on the characters in the recipient address field 202 and the local-part of the email addresses in the address book. Hence, as described above, the number of different domain-parts of the email addresses of the recipient address options in the recipient address list 208 can be reduced by narrowing the local-parts of the email addresses of the recipient address options. However, an alternative method of reducing the number of different domain-parts in the recipient address options of the recipient address list 208 is now described. As shown in FIG. 4B, the email addresses of the recipient address options in the recipient address list 208 have a domain-part of either "@xdomain.com" or "@ydomain.com". The present rule will therefore be determined as unsatisfied at step S310 if the rule threshold is "less than two". When returning to step S302, the user may enter additional characters into the recipient address field 202, wherein these additional characters are instead used by the autocomplete algorithm to narrow the recipient address options in the recipient address list 208 against their domain-part as opposed to the local part. For example, in FIG. 4B, the user initially typed "ja" into the recipient address field 202 which gave rise to two different domain-parts in the recipient address options. As shown in FIG. 5C, in order to reduce the number of domain-parts, the user may type "ja y" into the recipient address field 202 at step S302. In step S304, the autocomplete algorithm uses the new character "y" in the recipient address field to narrow down the domain-parts of the recipient address options rather than the local-parts as previously described. Hence, as shown in FIG. 5C, the recipient address options in the recipient address list 208 in step S306 now comprise only the recipient address options with "ja" in the local part and "y" in the domain-part of the recipient address options' email addresses. The present rule is therefore satisfied for a rule threshold of "less than two". The autocomplete algorithm in step S304 is able to distinguish between the initial group of characters "ja" relating to the local-part of the email addresses and the second group of characters "y" relating to the domain-part of the email addresses through various means. For example, the autocomplete algorithm may distinguish between the two groups of characters via a character space in between the two groups, as shown in FIG. 5C. Alternatively or additionally, the autocomplete algorithm may distinguish between the two groups of characters using any alternative characters, symbols or methods that do not interfere with the autocomplete algorithm's assessment of the local-part or domain-part of the email address.

Another rule is based on the selection method used by the user to select a recipient address from the recipient address list 208 in step S308. In some cases, a user may be more prone to making mistakes in selecting a recipient address from the recipient address list 208 using certain input devices. Hence, this rule addresses these cases by limiting what input device the user can use to select the recipient address from the recipient address list 208. For example, the rule may require that the user selects the recipient address from the recipient address list 208 in step S308 using a computing mouse, in which case selecting the recipient address with a computing keyboard or any other alternative input device will not satisfy the rule in step S310. In some embodiments, the rule may particularly require that a user must double click on the recipient address using the computing mouse. Alternatively, the rule may require that the user selects the recipient address using a computing keyboard, in which case selecting the recipient address with a computing mouse or any other alternative input device will not satisfy the rule in step S310. Hence, in order to satisfy these rules, the user will have to select the recipient address from the recipient address list 208 using an allowed input method. For this rule, the rule list is a list of input methods that the user is allowed to use to select a recipient address from the recipient address list 208. For example, if the rule list shows that the user can select the recipient address in step S308 using only a computing keyboard, the rule will not be satisfied in step S310 until this requirement is met. Alternatively, the rule list may be a list of input methods that the user is not allowed to use to select a recipient address from the recipient address list 208. It should be appreciated that some instances of this rule may not be applicable on certain devices that the method 300 can be performed on. For example, if the method 300 is being performed on a mobile or tablet device, it may not be possible to select a recipient address from the recipient address list 208 using a virtual keyboard. Hence, this rule is adaptable based on the context of the email client such as the device on which it is hosted.

Another rule is based on the amount of time elapsed between the user typing characters into the recipient address field 202 in step S302 and the user selecting a recipient address from the recipient address list 208 in step S308. Particularly, if a user has typed characters into the recipient address field in step S302 and selected a recipient address in step S308 too fast, i.e. before a threshold time has elapsed, then the rule will be determined as not satisfied in step S310. Hence, for this rule, the rule threshold is the threshold time. This rule will be satisfied upon selecting the recipient address from the recipient address list 208 at step S308 after the threshold time has been reached. By declining recipient selection until a specified amount of time has passed, this rule helps to minimise mistakes where a user might quickly enter characters into the recipient address field 202 at step S302 and select a recipient address from the recipient address list 208 at step S308 without noticing their error. Instead, this rule forces the user to reflect on the characters entered at step S302 and the recipient address selected at step S308 for a certain amount of time before proceeding.

Another rule is based on visible similarities between the recipient address selected at step S308 and the remaining recipient address options in the recipient address list 208. For example, recipient address options with addresses comprising visibly similar characters such as "ri" and "n" may have a high degree of visual similarity. Hence, a user attempting to select a recipient address "keri@xdomain.com" could accidentally select a recipient address option "ken@xdomain.com" at step S308. A statistical algorithm is therefore used on the recipient address selected in step S308 to determine degrees of visual similarity with the other recipient address options. If the selected recipient address and at least one remaining recipient address option has a degree of visual similarity higher than a threshold, the rule is determined as being unsatisfied in step S310. This rule can be overcome by typing more characters into the recipient address field 202 to resolve the visual ambiguity. For example, if the recipient address field 202 originally read "ke", the user may type "ker" to eliminate the recipient address option "ken@xdomain.com" from the recipient address list. Any known algorithm or technique for comparing visual similarities between words may be used to implement this rule.

Another rule is based on combinations of statistics associated with the recipient address selected at step S308 of the method 300. Such statistics may be used in combination to create a statistical "score" for the selected recipient address. If the recipient address selected at step S308 receives a statistical score greater than a threshold statistical score, the rule will be determined as satisfied at step S310. If this rule is not satisfied at step S310, the user is prompted to confirm the selection, for example, via a pop-up window on the user interface 200. Statistics applicable for this rule are described as follows.

Co-occurrence of the selected recipient address with existing recipient addresses of the email may be a considered statistic, which analyses how often the selected recipient address and the existing recipient addresses of the email have co-occurred as recipients in previous emails. A high co-occurrence with the existing recipient addresses may indicate that the selected recipient address is less likely to have been selected in error. Hence, a high co-occurrence with existing recipient addresses can contribute to a higher statistical score. In some embodiments, the co-occurrence statistic may be a numerical count of the number of previous emails in which the selected recipient address has co-occurred with the existing recipients of the present email. It should be appreciated that a co-occurrence count to the above effect may be implemented using any known techniques.

Correlation between the selected recipient address and discussion topics in the text body 204 of the email may be used as a statistic. Particularly, if the selected recipient address has not historically been involved in email discussions or threads in relation to the topics in the present email, it is more likely that the selected recipient address has been selected in error. Hence, a low correlation between the selected recipient address and the discussion topics in the text body 204 of the present email may diminish the statistical score. The discussion topics are extracted from the text body and analysed in conjunction with the recipient addresses and past discussion topics using a machine learning or artificial intelligence algorithms. The topic correlation may be determined using any other known techniques. For example, in some embodiments, the topic correlation may be determined using a suitable bag-of-words algorithm. For each word in the text body of the present email, the bag-of-words algorithm may analyse the text bodies of past emails that the selected recipient was included in to determine the frequency of each word. The topic correlation may be represented as a count of the total word frequency, i.e. number of times the words in the text body of the present email have been present in the text bodies of past emails that the selected recipient was included in.

Past errors in recipient address selection by the user may be considered as a statistic for the present rule. Particularly, if the user has erroneously selected the presently selected recipient address in the past, it may be likely that the presently selected recipient address has been selected in error. Whether a user has erroneously selected a recipient address in the past may be determined, for example, by checking if the user has been forced to delete the selected recipient address from the recipient address field 202 after it has been added to the recipient address field 202. Therefore, in some embodiments, the past error statistic may be represented as a numerical count of the number of times that a user has erroneously selected a recipient address when addressing past emails. The past error count may be incremented each time that it is determined that the user has erroneously selected a recipient address. Any other known technique may be used to determine the number of past errors. Higher rates of past recipient address selection errors, e.g. indicated by deletion, may contribute to a lower statistical score. Past errors in recipient address selection described above may be determined by invoking data logs of past use of the method 300.

Historical character patterns used by the user to select specific recipient addresses may be considered as a statistic for the present rule. Particularly, the user may frequently use the same combination of characters at step S302 before selecting the presently selected recipient address at step S308. However, if the user deviates from the frequently used combination of characters at step S302 but still selects the same selected recipient address at step S308, it may be likely that the selected recipient address has been selected in error. Hence, deviations from past selection patterns may contribute to a lower statistical score. The historical character patterns described above may be determined using any known technique. For example, the historical character patterns described above may be determined by invoking and analysing data logs of past use of the method 300 using any known technique.

It should be appreciated that the different types of statistics described above may be applied to the present rule in any combination. Alternatively, the statistics may be determined as separate rules with corresponding separate statistical scores and rule thresholds. Furthermore, it has been described how some of the above statistics may be represented as numerical counts. In such embodiments, the numerical counts of each statistic may be summed and/or subtracted to provide the statistical score. Correspondingly, the threshold statistical score may be a threshold count level.

Another rule is based on the origin of the recipient address selected at step S308 of the method 300. In some cases, the address book that is used to generate the recipient address options at step S304 may be a compilation of different constituent address books from different users and different user email accounts. Hence, the present rule is configured to be satisfied only when the recipient address selected at step S308 is from a certain constituent or a certain set of constituent address books of the overall address book. For this rule, the rule list is a list of constituent address books that are permissible for selecting a recipient address from. Alternatively, the rule list may be a list of constituent address books that are not permissible for selecting a recipient address from.

Another rule is based on the position of the recipient address selected at step S308 of the method 300 in the recipient address list 208. In some cases, it may be assumed that the user is more likely to have erroneously selected a recipient address at step S308 if it is at the very top of the recipient address list 208. Hence, if the present rule is active, the present rule will not be satisfied if the recipient address selected at step S308 of the method 300 is at the top of the recipient address list 208. Alternatively, the present rule may not be satisfied if the recipient address selected at step S308 is in a different position in the recipient address list 208, such as at the bottom. For this rule, the rule list may be a list of positions in a recipient address list 208 that the user cannot select at step S308. Alternatively, the rule list may be a list of positions in a recipient address list that the user can exclusively select.

Another rule is based on whether the recipient address selected at step S308 is present in a predefined list of unauthorised recipient addresses. Particularly, if the recipient address selected at step S308 is present in a predefined list of unauthorised recipient addresses, the rule will not be determined as satisfied at step S310. In this rule, the predefined list of unauthorised recipient addresses is the rule list. The list of unauthorised recipient addresses may be predefined by an administrator of the device that the method 300 is being performed on, or a system of devices that the method 300 may be performed on. Alternatively or additionally, the user performing the method 300 may predefine the list of unauthorised recipient addresses. The predefined list may be stored and accessed locally from a storage medium 108 on a device 100 on which the method 300 can be performed. Alternatively, the predefined list may be stored and accessed from an external server that the device 100 is in data communication with.

The rules described herein may be implemented using any techniques known to the skilled person, including any known algorithms, programming techniques and/or programming libraries.

The rules described above are those that are available at step S310 in the method 300. However, as previously described, not all of the available rules need be active at step S310. Rather, the available rules that are active at step S310 can be dynamically deactivated and activated based on a plurality of rule factors. Furthermore, the rule threshold levels and rule lists of the rules that are active at step S310 are completely dynamic and customisable based on rule factors.

The rule factors concern situations where a user is more prone or more likely to make a mistake when selecting a recipient address for an email during step S308 of the method 300. Hence, in situations where the user is more likely to make a mistake when selecting a recipient address for an email, more rules can be activated and/or the rule thresholds and lists of the active rules can be adapted to impose stricter conditions for satisfying the rules. As examples, rule thresholds may be adapted so that the user must type in more characters than usual into the recipient address field 202, allow more time to elapse between typing characters into the recipient address field 202 at step S302 and selecting a recipient address at step S308, or reduce the number of domain-parts present in the recipient address list 208 to fewer than usually required. Furthermore, rule lists may be adapted to impose more restrictions on what input device a user can use when selecting a recipient address at step S308, which address books the user can select a recipient address from, and what positions in the recipient address list 208 the user can select a recipient address from at step S308. On the contrary, in situations where the user is less likely to make a mistake when selecting a recipient address for an email, some rules may be deactivated and/or the rule thresholds and lists of the active rules may be relaxed. By having dynamic rules and rule thresholds/lists, a balance of active rules and rule thresholds/lists can be achieved so that a user is sufficiently prevented from making recipient address selection errors at step S308 whilst minimising potential inconveniences caused by the rules by ensuring that some rules are not unnecessarily active or imposed at unnecessarily high restrictions. The rule factors are described in more detail as follows.

In some embodiments, the time of day when performing the method 300 may be considered as a rule factor, where it is assumed that a user is more likely to make a mistake at certain times of the day. For example, a user may be more likely to make a mistake in the evening or at night than in the daytime. Hence, more rules may be activated and/or stricter rule thresholds/lists may be imposed at the times of the day where the user is more prone to make a mistake in selecting a recipient address for an email.

In some embodiments, the location of the user when performing the method 300 may be considered as a rule factor, where it is assumed that a user is more likely to make a mistake in selecting a recipient address in certain geographical locations. For example, a user may be more likely to make a mistake in selecting a recipient address at their home and less likely to make a mistake at an office location. Hence, more rules may be activated and/or stricter rule thresholds/lists may be imposed when the user is performing the method 300 at locations where the user is more prone to making a mistake in selecting a recipient address.

In some embodiments, the type of computing device that the user is performing the method 300 on may be considered as a rule factor, where it is assumed that a user is more likely to make a mistake in selecting a recipient address on certain computing devices. For example, a user may be more likely to make a mistake using a mobile device as opposed to a desktop computer due to the size of the device, its processing power, its operating system or its input/output device type. Hence, more rules may be activated and/or stricter rule thresholds/lists may be imposed when the user is performing the method 300 on computing devices on which the user is more prone to making a mistake when selecting a recipient address.

In some embodiments, the sensitivity level of the email may be considered as a rule factor. Particularly, for emails with a higher sensitivity, such as emails marked as confidential, erroneously selecting a wrong recipient address can be more detrimental to the user if the erroneously selected recipient address is unauthorised to receive the confidential information in the email. Hence, the user may benefit from additional rules and/or stricter rule thresholds/lists when writing sensitive emails.

In some embodiments, the rules may be adapted so that users with a history of making relatively more recipient address selection errors have more active rules and/or stricter than average rule thresholds/lists imposed at step S310. This rule may also extend to adapt the active rules and rule thresholds/lists to general behaviours of specific users and groups of users. Such historical behaviour by users may be determined by invoking data logs of past use of the method 300.

In some embodiments, the number of existing recipient addresses in the email may be considered as a rule factor. For example, as more recipient addresses are added to the email, the scope of recipient addresses for the email may become clearer making it unnecessary to have a larger number of strict rules imposed at step S310. Hence, where there are many recipient addresses in the email, it can be beneficial to deactivate some rules and/or relax the rule thresholds/lists in order to make it easier to add more recipient addresses.

In some embodiments, the number of recipient address options generated at step S304 may be considered as a rule factor. Particularly, where only a relatively small number of recipient address options have been generated, it may be unnecessary to enforce some rules or a large number of rules. For example, if the recipient address list 208 only comprises two options, it will not be necessary to enforce a rule that does not allow the selection of a recipient address option that is at a certain position in the recipient address list 208.

The rule factors described above may be used in any combination to dynamically adapt the rules that are active at step S310 of the method 300 as well as their rule thresholds and lists. Alternatively or additionally, the rules that are active at step S310 and their respective rule thresholds and lists can be manually adjusted by the user and/or a system administrator. Manual configuration of the active rules and the rule thresholds/lists involves accessing a rule configuration user interface where the available rules can be activated and deactivated, and the rule thresholds and lists of the available rules can be adjusted and configured. Where the rules and rule thresholds/lists are stored locally on the device, the configuration user interface is accessible locally on the operating system of the device implemented via an add-in program to the email client. Alternatively, where the rules and rule thresholds/lists are stored externally at an external server, the configuration user interface may be accessible via a web-browser and hosted on a server or cloud platform.

In some embodiments, at step S310, the active rules may be distinguished from the deactivated rules based on an indicator variable associated with each rule. Hence, if the indicator shows the rule as inactive, it will not be considered at step S310 of the method 300. Alternatively, deactivating a rule can involve setting the rule threshold of the rule to a consistently achievable default value. For example, for most rules, setting the rule threshold to a value such as "0" will mean that the rule is always satisfied. For some rules, this can be achieved by setting the rule threshold to a very high value. For some rules, deactivating a rule can also involve setting the rule lists in a way that the corresponding rule is consistently satisfied.

According an alternative embodiment of the method 300, one or more of the rule factors described above may be used in any combination to dynamically enable or disable the warning window which gives the user the option to override the declination at step S314. For example, in situations where the user is more prone to making recipient address selection errors, the warning window and override option may be disabled to ensure that the user does not accidentally override a declination. On the contrary, the warning window and override option may be enabled where the user is in a situation that is less likely to result in a recipient address selection error. Alternatively, the warning window with the option to override the declination at step S314 can be manually enabled or disabled using the configuration interface described above.

The rule factors described herein may be implemented in combination with the rules using any techniques known to the skilled person, including any known algorithms, programming techniques and/or programming libraries.

Various modifications will be apparent to those in the art and it is desired to include all such modifications as fall within the scope of the accompanying claims.

The methods, rules and rule thresholds/lists described above have been described in relation to selecting a recipient address from a recipient address list in an email computing environment. However, it should be appreciated that the methods of selecting a recipient address from a recipient address list described herein may also be applied in non-email computing environments. Examples of non-email environments in which the above methods and rules can be applied include selecting recipients in alternative messaging environments such as all types of mobile messaging, SMS, and Internet text messaging applications (e.g. Slack and WhatsApp).

Some of the rules described above have been described as being applied to the recipient address options that are present in the recipient address list. However, it should be appreciated that in an alternative embodiment where only a subset of recipient address options are present in the recipient address list, the rules may be performed with regard to all of the recipient address options as opposed to only those that are present in the recipient address list. Alternatively, whether or not all recipient address options are considered when assessing a rule may be decided on a rule-by-rule basis, either dynamically based on rule factors or manually configured with the configuration interface.

The methods of selecting a recipient address from a recipient address list described above include performing an autocomplete operation based on characters or symbols typed into a recipient address field compared against the local-parts of email addresses in address books (e.g. at step S304 in the method 300). However, email address books may store a recipient's forename, surname or other nickname in association with their email address. Hence, the skilled person will appreciate that where autocomplete operations with respect to the local-parts of email addresses is described above, corresponding associated forenames, surnames and nicknames may additionally or alternatively be considered by the autocomplete algorithm. Similarly, email address books may also store a recipient's business or company name details in association with their email address. Hence, the skilled person will appreciate that where autocomplete operations with respect to the domain-parts of email addresses is described, the associated business details or company names in the address book may additionally or alternatively be considered by the autocomplete algorithm.

In addition to the above, it will be appreciated that where recipient addresses are displayed in recipient address fields and recipients address lists, this may include displaying any combination of associated forenames, surnames, nicknames, and business details/names. For example, where a selected recipient address is entered into the recipient field, the method may display only the associated forename and surname rather than the full recipient address itself.

In some embodiments, an autocomplete list or recipient address list may not be necessary in order to carry out the method 300 of recipient address selection. For example, in some embodiments, an autofill feature might be used. The user may enter characters into the recipient field. Recipient address options may be generated using an autocomplete algorithm. However, rather than generate a recipient address list, the top recipient address option (i.e. the recipient address option determined to be the most likely recipient) may be displayed in the recipient address field. The user may select or confirm the top recipient address option using a key press, mouse click, or other forms of user input. The rules may therefore be checked at this step of selection to determine whether to enter or maintain the top recipient address option in the recipient address field, or delete the top recipient address option from the recipient address field.

It will be appreciated that the above methods and embodiments are not necessarily limited to situations where a user performing the methods selects a recipient address in error. Rather, the above methods may be employed in situations where a user selects an intended recipient address, but the selection request is denied since the selected recipient address is determined to be unauthorised by virtue of failing to satisfy any combination of the above rules.

As described in the method above, a recipient address selection request is made by a user selecting a recipient address from a recipient address list, and subsequently, the rules are checked to determine whether to allow the selected recipient address to be added to or completed in the recipient address field. However, it should be appreciated that the order of selecting a recipient address, checking the rules, and completing/not completing the selected recipient address in the address field is not limited as such. For example, in some cases, the rules may be checked after the recipient address has been added to or completed in the recipient address field, where if rules are determined as not being satisfied, the recipient address may be subsequently deleted.

There follows a list of numbered features labelled F1 . . . FN defining particular embodiments of the present disclosure. Where a numbered feature refers to an earlier numbered feature then those features may be considered in combination.

F1. A method of selecting a recipient address from a recipient address list, the method comprising:
  receiving characters as a user input to a recipient address field;
  displaying a recipient address list, based on the characters received in the recipient address field;
  receiving a selection from a user for a recipient address in the recipient address list;
  in connection with the recipient address list or the user input, determining if one or more rules are satisfied; and
  entering the selected recipient address into the recipient address field, depending on whether or not the one or more rules are satisfied.

F2. The method of F1, wherein:
  if at least one of the one or more rules is determined as not being satisfied, preventing the selected recipient address from being entered into the recipient address field; or
  if the one or more rules are determined as being satisfied, entering the selected recipient address into the recipient address field.

F3. The method of F2, wherein at least one of the one or more rules includes a corresponding rule threshold, and the method comprises comparing the recipient address list or the user input against the corresponding threshold, to determine if the rule is satisfied.

F4. The method of F3, wherein the one or more rules includes a first rule, the first rule threshold being the number of characters that have been received at the recipient address field, and the first rule being determined as satisfied when more than the threshold number of characters have been received at the recipient address field.

F5. The method of F3 or F4, wherein the one or more rules includes a second rule, the second rule threshold being the number of recipient address options appearing in the list, and the second rule being determined as satisfied if the number of generated recipient address options is less than the threshold.

F6. The method of F3, F4 or F5, wherein each recipient address option comprises a domain, wherein the one or more rules includes a third rule, the third rule threshold being the number of domains in the recipient address list, the third rule being determined as satisfied if the number of different domains in the recipient address list is less than the threshold.

F7. The method of any of F3 to F6, wherein the one or more rules includes a fourth rule, the fourth rule threshold being a statistical degree of similarity between characters input by the user and recipient addresses in the list, the fourth rule being determined as satisfied if the statistical degree of similarity between characters input by the user and recipient addresses in the list is less than the threshold.

F8. The method of any of F3 to F7, wherein the one or more rules includes a fifth rule, the fifth rule threshold being the amount of time elapsed between receiving characters as user input to the recipient address field, the fifth rule being determined as satisfied if the amount of time elapsed between receiving characters as user input to the recipient address field exceeds the threshold.

F9. The method of any of F3 to F8, wherein at least one of the one or more rules relates to statistics in relation to the requested recipient address, the statistics being used to generate a statistical score, said at least one of the one or more rules being determined as satisfied if the generated statistical score exceeds a predetermined threshold statistical score.

F10. The method of any of F2 to F9, wherein at least one of the one or more rules includes a corresponding rule list, and the method comprises consulting the rule list to determine if the rule is satisfied.

F11. The method of F10, wherein the one or more rules includes a sixth rule and a corresponding first rule list, the first rule list being a list of unauthorised recipient addresses, and the sixth rule being determined as satisfied if the unauthorised recipient address list does not comprise the selected recipient address.

F12. The method of any of F10 or F11, wherein the one or more rules includes a seventh rule and a corresponding second rule list, the second rule list being a list of authorised selection devices, and the seventh rule being determined as satisfied if the selection request is made using an authorised selection device indicated by the second rule list.

F13. The method of any of F3 to F12, wherein the thresholds and rule lists are adjustable.

F14. The method of F13, wherein the thresholds and rule lists are dynamically adjustable.

F15. The method of F11, wherein the thresholds and rule lists are dynamically adjustable based on at least one of:

a date and time at which the method is being performed;

a location at which the user is performing the method;

a device type that the user is using to perform the method; and the user's recipient address selection history.

F16. The method of any preceding Feature, wherein each of the one or more rules may be activated or deactivated.

F17. The method of F16, wherein each of the one or more rules are dynamically activated and deactivated based on at least one of:

a date and time at which the method is being performed;

a location at which the user is performing the method;

a device type that the user is using to perform the method; and the user's recipient address selection history.

F18. The method of any preceding Feature, further comprising: displaying a warning window when at least one of the one or more rules is determined as not being satisfied.

F19. The method of F18, wherein the warning window comprises an option for the selected recipient address to be entered into the recipient field.

F20. The method of any preceding Feature, wherein the step of receiving a selection is a user input.

F21. The method of F20, wherein the user input is a mouse click, a screen press or a key press.

F22. The method of any preceding Feature, further comprising:

prior to displaying the recipient address list, generating recipient address options, based on the characters entered in the recipient address field;

wherein the recipient address list is at least a subset of the recipient address options.

F23. A method of selecting a recipient address from a recipient address list, the method comprising:

receiving characters as a user input to a recipient address field;

displaying a recipient address list, based on the characters received in the recipient address field;

receiving a selection from a user for a recipient address in the recipient address list; and after the selected recipient address has been entered into the recipient address field in response to the selection request, in connection with the recipient address list or the user input, determining if one or more rules are satisfied; and deleting or maintaining the selected recipient address in the recipient address field, depending on whether or not the one or more rules are satisfied.

F24. A method of entering a recipient address in a recipient address field, comprising:

receiving one or more characters into the recipient address field;

displaying one or more recipient addresses, based on the one or more characters;

receiving an input from the user selecting one of the recipient addresses to be entered into the recipient address field;

determining, using one or more rules, whether to allow the selected recipient address to be entered into the recipient address field; and if the selected recipient address is allowed, entering or maintaining the selected recipient address in the recipient address field.

F25. A device configured to perform the method of any of F1 to F24.

F26. The device according to F25, the device comprising: memory for storing computer readable instructions for carrying out the method of any of F1 to F24, and a processor for executing the instructions.

F27. The device according to F26, further comprising: a display; and user input means.

F28. A computer program, or suite of computer programs, configured to, when run on a processor, cause a computing device to carry out the steps of any of F1 to F24.

F29. A computer-readable storage medium comprising the computer program of F28.

F30. A device, comprising:

means for receiving characters as a user input to a recipient address field;

means for displaying a recipient address list, based on the characters received in the recipient address field;

means for receiving a selection from a user for a recipient address in the recipient address list;

means for determining, in connection with the recipient address list or the user input, if one or more rules are satisfied; and means for entering the selected recipient address into the recipient address field, depending on whether or not the one or more rules have been satisfied.

F31. A device comprising:

means for receiving characters as a user input to a recipient address field;

means for displaying a recipient address list, based on the characters received in the recipient address field;

means for receiving a selection from a user for a recipient address in the recipient address list; and means for determining, after the selected recipient address has been entered into the recipient address field in response to the selection request, in connection with the recipient address list or the user input, if one or more rules are satisfied; and means for deleting or maintaining the selected recipient address in the recipient address field, depending on whether or not the one or more rules are satisfied.

F32. A device comprising:

means for receiving one or more characters into the recipient address field;

means for displaying one or more recipient addresses, based on the one or more characters;

means for receiving an input from the user selecting one of the recipient addresses to be entered into the recipient address field;

means for determining, using one or more rules, whether to allow the selected recipient address to be entered into the recipient address field; and means for entering or maintaining the selected recipient address in the recipient address field if the selected recipient address is allowed.

The invention claimed is:

1. A method of selecting a recipient address from a recipient address list, the method comprising:

receiving characters as a user input to a recipient address field;

displaying a recipient address list, based on the characters received in the recipient address field;

receiving a selection from a user for a recipient address in the recipient address list;

in connection with the recipient address list or the user input, determining if one or more rules are satisfied; and entering the selected recipient address into the recipient address field, depending on Whether or not the one or more rules are satisfied.

2. The method of claim 1, wherein:
- if at least one of the one or more rules is determined as not being satisfied, preventing the selected recipient address from being entered into the recipient address field; or
- if the one or more rules are determined as being satisfied, entering the selected recipient address into the recipient address field.

3. The methods of claim 2, wherein at least one of the one or more rules includes a corresponding rule threshold, and the method comprises comparing the recipient address list or the user input against the corresponding rule threshold, to determine if the rule is satisfied.

4. The method of claim 3, wherein the one or more rules includes a first rude, a first rule threshold being a number of the characters that have been received at the recipient address field, and the first rule being determined as satisfied when more than the first rule threshold number of the characters have been received at the recipient address field.

5. The method of claim 3, wherein the rules include a second rule, a second rule threshold being a number of recipient address options appealing in the list, and the second rule being determined as satisfied if a number of generated recipient address options is less than the threshold.

6. The method of claim 3, wherein each recipient address option comprises a domain, wherein the rules include a third rule, a third rule threshold being a number of domains in the recipient address list, the third rule being determined as satisfied if a number of different domains in the recipient address list is less than the third rule threshold.

7. The method of claim 3, wherein the rules includes at least one of:
- a fourth rule, a fourth rule threshold being a statistical degree of similarity between characters input by the user and recipient addresses in the list, the fourth rule being determined as satisfied if the statistical degree of similarity between characters input by the user and recipient addresses in the list is less than the fourth rule threshold; or
- a fifth rude, a fifth rule threshold being an amount of time elapsed between receiving characters as user input to the recipient address field, the fifth rule being determined as satisfied if the amount of time elapsed between receiving characters as user input to the recipient address field exceeds the fifth rule threshold.

8. The method of claim 3, wherein at least one of the one or more rules relates to statistics in relation to the selected recipient address, the statistics being used to generate a statistical score, said at least one of the one or more rules being determined as satisfied if the generated statistical Wore exceeds a predetermined threshold statistical score.

9. The method of claim 2, wherein at least one of the one or more rules includes a corresponding rule list, and the method comprises consulting the rule list to determine if the rule is satisfied.

10. The method of claim 9, wherein the rules include at least one of:
- a sixth rule and a corresponding first rule list, the first rule list being a list of unauthorised recipient addresses, and the sixth rule being determined as satisfied if the unauthorised recipient address list does not comprise the selected recipient address; or
- a seventh rule and a corresponding second rule list, the second rule, list being a list of authorised selection devices, and the seventh rule being determined as satisfied if the selection, request is made using an authorised selection device indicated by the second rule list.

11. The method of claim 10, wherein the rule lists are dynamically adjustable based on at least one of:
- a date and time at which the method is being performed;
- a location at which the user is performing the method;
- a device type that the user is using to perform the method; and
- a user's recipient address selection history.

12. The method of claim 1, wherein each of the one or more rules are dynamically activated and deactivated based on at least one of:
- a date and time at which the method is being performed;
- a location at which the user is performing the method;
- a device type that the user is using to perform the method; and
- a user's recipient address selection history.

13. The method of claim 1, wherein the step of receiving a selection is a user input, and wherein the user input is a mouse click, a screen press or a key press.

14. The method of claim 1, further comprising:
- prior to displaying the recipient address list, generating recipient address options, based on the characters entered in the recipient address field, wherein the recipient address list is at least a subset of the recipient address options; and
- optionally, displaying a warning window when at least one of the one or more rules is determined as not being satisfied, wherein the warning window preferably comprises an option for the selected recipient address to be entered into the recipient field.

15. A method of selecting a recipient address from a recipient address list, the method comprising:
- receiving characters as a user input to a recipient address field;
- displaying a recipient address list, based on the characters received in the recipient address field;
- receiving a selection from a user for a recipient address in the recipient address list; and
- after the selected recipient address has been entered into the recipient address field in response to the selection request, in connection with the recipient address list or the user input, determining if one or more rules are satisfied; and
- deleting or maintaining the selected recipient address in the recipient address field, depending on whether or not the one or more rules are satisfied.

16. A method of entering a recipient address in a recipient address field, comprising:
- receiving one or more characters into the recipient address field;
- displaying one or more recipient addresses, based on the one or more characters;
- receiving an input from a user selecting one of the recipient addresses to be entered into the recipient address field;
- determining, using one or more rules, whether the selected recipient address to be entered into the recipient address field; and
- if the selected recipient address is allowed, entering or maintaining the selected recipient address in the recipient address field.

17. A device comprising:
a memory storing executable instructions; and
a processor communicatively coupled to the memory, the processor configured for executing the instructions and thereby performing operations comprising:
    receiving characters as a user input to a recipient address field;
    causing a display device to display a recipient address list, based on the characters received in the recipient address field;
    receiving a selection from a user for a recipient address in the recipient address list;
    determining, in connection with the recipient address list or the user input, that one or more rules are satisfied; and
    entering the selected recipient address into the recipient address field, based on the one or more rules being satisfied.

18. The device of claim 17, further comprising the display device and a user input device configured for receiving input comprising the characters and the selection.

19. A non-transitory computer-readable storage medium having instructions stored thereon, the instructions executable by a processing device to perform operations comprising:
    receiving characters as a user input to a recipient address field;
    displaying a recipient address list, based on the characters received in the recipient address field;
    receiving a selection from a user for a recipient address in the recipient address list;
    in connection with the recipient address list or the user input, determining if one or more rules are satisfied; and
    entering the selected recipient address into the recipient address field, depending on whether or not the one or more rules are satisfied.

20. The non-transitory computer-readable storage medium of claim 19, the instructions further comprising:
    prior to displaying the recipient address list, generating recipient address options, based on the characters entered in the recipient address field, wherein the recipient address list is at least a subset of the recipient address options; and
    displaying a warning window when at least one of the one or more rules is determined as not being satisfied, wherein the warning window preferably comprises an option for the selected recipient address to be entered into the recipient field.

\* \* \* \* \*